Oct. 12, 1926.
L. BERTOLOTTO
ANNUNCIATOR FOR AUTOMOBILES
Filed April 23, 1925
1,602,998
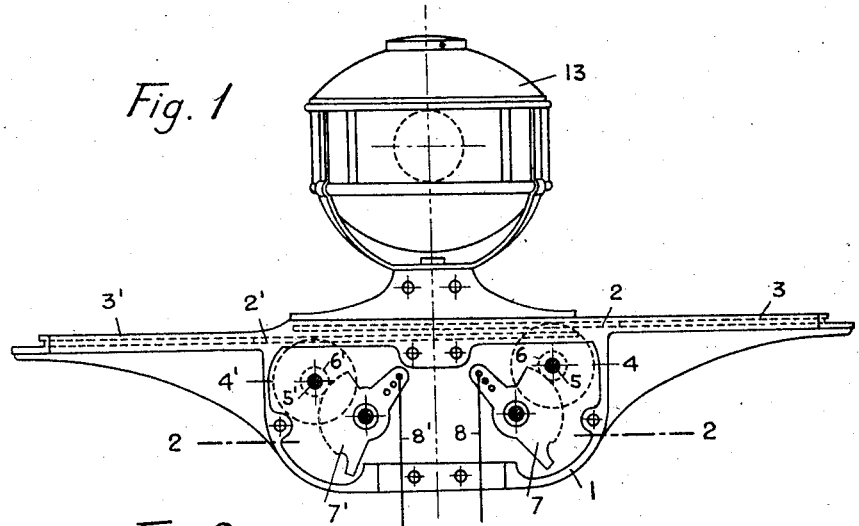
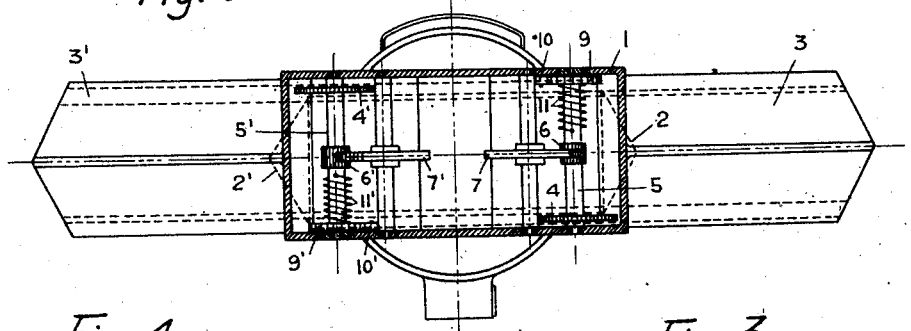
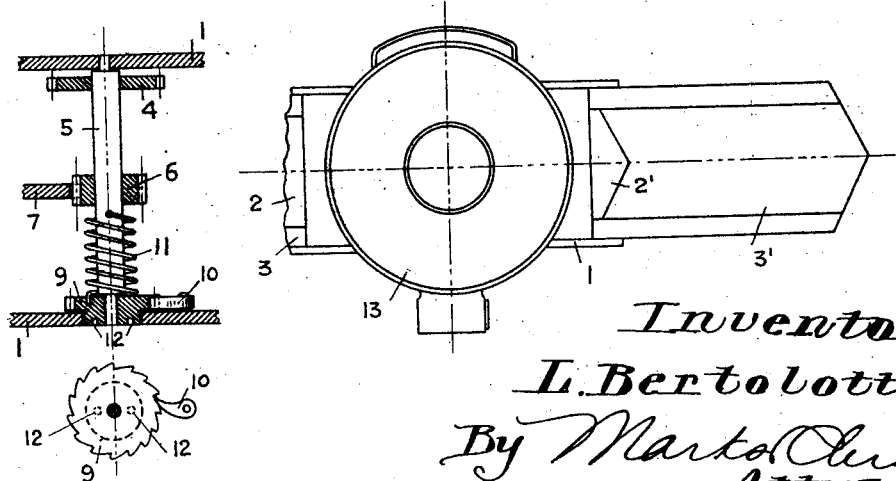
Inventor
L. Bertolotto
By Marks Clark
Attys.

Patented Oct. 12, 1926.

1,602,998

UNITED STATES PATENT OFFICE.

LUIGI BERTOLOTTO, OF GENOA, ITALY.

ANNUNCIATOR FOR AUTOMOBILES.

Application filed April 23, 1925, Serial No. 25,460, and in Italy April 30, 1924.

The invention refers to an indicating apparatus for automobiles rendering possible for the driver of an automobile to mechanically display signals announcing from its automobile to automobiles at the rear thereof whether he proposes to turn to the right or to the left or to slow down the speed or to stop the machine.

According to the invention in a casing fastened at the rear of the automobile are situated two vertically arranged indicating planes which in its position of departure substantially assume a superposed position and each one being engaged by means of a rack with a toothed wheel rigidly fastened on a drive shaft supported in the wall of the casing. Two wire ropes extending with one end within the reach of the automobile driver connect with the other end respectively with an arm of a toothed segment engaging a spur wheel fastened on every drive shaft so that a traction effort exerted on these wire ropes will provocate the rotation of the drive shafts in one direction and the displacement of the indicating planes towards the outside in the indicating position, whilst the indicating plane under the effort of a counter acting spiral spring surrounding the drive shaft will return in its position of departure as soon as the traction effort on the wire rope ceases.

By displacing the left hand indicating plane, the automobile driver may announce to an automobile at the rear that he proposes to turn to the left and by displacing the right hand indicating plane that he proposes to turn to the right whilst in displacing both indicating planes together he proposes to slow down the speed or to stop the machine.

The invention is illustrated in a form of execution in the drawings in which:

Fig. 1 is a plan view of the annunciator with the cover of the casing taken off;

Fig. 2 is a back view of the annunciator with a vertical section according to the line 2—2 of Fig. 1;

Fig. 3 is a partial front view of the annunciator;

Fig. 4 is a detail of the arrangement of a drive shaft on the walls of the casing.

In these figures within the casing 1 are slidably arranged the two vertical indicating planes 2—2' which in its position of departure are substantially superposed and which are adapted to be displaced respectively towards the left and towards the right within guides 3—3' into the indicating position. For the displacement of the indicating planes 2—2' are provided two separate alike devices symmetrical to the axis of the apparatus. For the displacement of the plane 2 the same is provided with a rack engaging a toothed wheel 4 rigidly fastened upon the drive shaft 5. This shaft is supplied with a toothed wheel 6 engaging a toothed segment 7 with which connects the wire rope 8. The drive shaft 5 with one end is rotatably arranged upon the wall of the casing 1, with the other end rotatably arranged within a ratchet wheel 9 in which engages a ratchet 10 pinned upon the wall of the casing 1. 11 is a spiral spring surrounding the shaft 5 connected with one end with the shaft 5 and with the other end with the ratchet wheel 9. 12 are two holes on the ratchet wheel 9 for the application from the outside of the casing of a key in order to concede the necessary tension to the spiral spring which tends to bring the indicating plane from the indicating position in its position of departure as soon as the traction effort ceases on the wire rope.

Identical means 4', 5', 6', 7', 8', 9', 10', 11', 12' are provided for the command of the indicating plane 2'.

13 is a transparent casing enclosing an electric lamp adapted to lighten the indicating planes during the night.

I claim:—

1. An annunciator of the class described comprising a casing adapted to be mounted at the rear part of a vehicle, a pair of vertically arranged indicator planes slidably mounted within said casing and assuming substantially a superposed position when in the inoperative condition, a horizontal rack provided on each plane, vertical drive shafts secured in said casing and a gear wheel fastened on each vertical drive shaft in engagement with each rack, a pinion fastened on each drive shaft and a gear segment in engagement with each pinion and a wire rope connected with each gear segment extending within reach of the vehicle driver, whereby the traction effort exerted on the wire ropes will displace the two indicator planes towards the outside in the indicator position.

2. An annunciator according to claim 1, the drive shafts rotatably arranged with one end in the wall of the casing with the other end upon a ratchet wheel engaged by a pawl pinned on the wall of the casing and a spiral spring surrounding the drive shaft and connecting with one end with said shaft and the other end with the ratchet wheel.

In testimony whereof I have signed my name to this specification.

LUIGI BERTOLOTTO.